(12) United States Patent
Goris et al.

(10) Patent No.: US 8,482,511 B2
(45) Date of Patent: Jul. 9, 2013

(54) STEREOCOPIC VISUALISATION

(75) Inventors: Roeland Focco Everhard Goris, Eindhoven (NL); Peter-Andre Redert, Eindhoven (NL)

(73) Assignee: Koninklijke Philips Electronics N.F., Eindhoven (NL)

( * ) Notice: Subject to any disclaimer, the term of this patent is extended or adjusted under 35 U.S.C. 154(b) by 405 days.

(21) Appl. No.: 12/744,343

(22) PCT Filed: Nov. 6, 2008

(86) PCT No.: PCT/IB2008/054629
§ 371 (c)(1),
(2), (4) Date: May 24, 2010

(87) PCT Pub. No.: WO2009/069026
PCT Pub. Date: Jun. 4, 2009

(65) Prior Publication Data
US 2010/0289883 A1    Nov. 18, 2010

(30) Foreign Application Priority Data
Nov. 28, 2007 (EP) ..................... 07121783

(51) Int. Cl.
*G09G 3/36* (2006.01)
(52) U.S. Cl.
USPC ............................. 345/102; 345/1.1; 348/51
(58) Field of Classification Search
USPC ..... 345/102, 1.1–9; 348/51–60; 359/462–465
See application file for complete search history.

(56) References Cited

U.S. PATENT DOCUMENTS
5,821,989 A   10/1998   Lazzaro et al.
7,215,356 B2   5/2007   Lin et al.
(Continued)

FOREIGN PATENT DOCUMENTS
EP   1571644 A1   9/2005
GB   2420183 A   5/2006

OTHER PUBLICATIONS
Woods et al: "Characterising Sources of Ghosting in Time-Sequential Stereoscopic Video Displays"; Stereoscoscopic Displays and Virtual Reality Systems IX, Proceedings of the SPIE, vol. 4660, Jan. 21, 2002, pp. 66-77.
(Continued)

*Primary Examiner* — Jimmy H Nguyen (57) ABSTRACT

A liquid crystal (LC) display system includes an LC panel and a backlight unit. A controller controls the LC panel to display first and a second images forming a stereoscopic pair; controls the backlight unit to only illuminate the LC panel during a first time period after pixels of the LC panel have a stable optical state according to the first image, and during a second time period after the pixels have a stable optical state according to the second image; and generates a control signal for controlling a first shutter glass of a pair of 3D shutter glasses to be in a transmissive state for enabling viewing of the pixels of the LC panel only during the first time period, and a second shutter glass to be in a transmissive state for enabling viewing of the pixels of the LC panel only during the second time period.

10 Claims, 5 Drawing Sheets

U.S. PATENT DOCUMENTS

| | | |
|---|---|---|
| 7,830,357 B2 * | 11/2010 | Kitaoka et al. ............... 345/102 |
| 2004/0041760 A1 | 3/2004 | Tsumura et al. |
| 2005/0259064 A1 * | 11/2005 | Sugino et al. ................ 345/102 |
| 2006/0072006 A1 * | 4/2006 | Lin et al. ......................... 348/51 |
| 2006/0146007 A1 | 7/2006 | Lim et al. |
| 2007/0035494 A1 | 2/2007 | Chang |
| 2007/0171317 A1 | 7/2007 | Ho et al. |
| 2007/0229487 A1 * | 10/2007 | Slavenburg et al. .......... 345/213 |

OTHER PUBLICATIONS

Woods et al: "Compatibility of LCD Monitors With Frame-Sequential Stereoscopic 3D Visualisation"; IMID/IDMC '06 Digest, The 6th International Meeeting on Information Display, and the 5th International Display Manufacturing Conference, Daeju, South Korea, Aug. 2006, pp. 98-102.

* cited by examiner

STEREOCOPIC VISUALISATION

FIELD OF THE INVENTION

The invention relates to a LCD display system, a method of displaying a stereoscopic image, and a computer program product comprising code for performing the steps of the method.

BACKGROUND OF THE INVENTION

The use of a pair of Liquid Crystal Shutter 3D glasses (further referred to as LCS 3D glasses) to view stereoscopic images displayed on Cathode Ray Tubes (further referred to as CRTs) is well known.

The publication "Compatibility of LCD Monitors with Frame-Sequential Stereoscopic 3D Visualisation" of Andrew J. Woods, Ka Lun Yuen, Centre for Marine Science & Technology, Curtin University of Technology, GPO Box U1987, Perth Wash. 6845, Australia, IMID/IDMC '06 Digest, pg. 98-102, 22-25 Aug. 2006, discusses LCS 3D glasses for viewing 3D information on LCD (Liquid Crystal Display) monitors. This publication discloses with respect to FIG. 4 that ghosting could be minimized if the addressing of the LCD panel of the LCD monitor could be sped up. It is said that during a period in time a single image could be seen exclusively on the screen if a full panel update would be completed in 50% of the time period of one frame rather than a full period of one frame.

However, this approach has the drawback that the LCS 3D glasses have to be switched on for a small period of time only and thus must be fast.

SUMMARY OF THE INVENTION

It is an object of the invention to provide a 3D visualisation by viewing a stereoscopic image displayed on a LCD display with 3D glasses which need not be fast.

A LCD display system in accordance with the first aspect of the invention comprises a LC panel, a backlight unit for illuminating the LC panel or a portion thereof, and a controller (3).

The backlight unit may illuminate the complete LC panel continuously or pulsed. Alternatively, the backlight unit may generate a scanning backlight which sequentially illuminates portions of the LCD display. The portions may be groups of adjacent rows of pixels of the LCD display.

The controller controls the LC panel to display a first image and a second image forming a stereoscopic pair. The first image may be the left image intended for the left eye of the observer and the second image may be the right image intended for the right eye of the observer.

The controller controls the backlight unit to only illuminate the LC panel or the portion thereof during a first period in time after the pixels of the LC panel or the portion thereof have a stable optical state according to the first image. Thus, first the pixels of the LC panel or the portion thereof are addressed and consequently reach their optical state after their response time. Then, the backlight is switched on to illuminate these pixels which have reached their stable optical state. Next, after the backlight is switched off, during a second period in time after the pixels of the LC panel or the portion thereof are addressed and have reached a stable optical state according to the second image the backlight is switched on again. It has to be noted that with stable optical state is not meant that the optical state does not anymore change towards the end state at all. For example, the optical state may be considered to be stable if 90% of the end state is reached. For example, if the pixels are overdriven, the optical state may be considered to be stable if it varies between 90% and 110%. If the backlight is switched on during the period in time where the optical state varies from 90% to 110%, the average optical state is or is near to 100%.

Further, the controller generates a control signal to control a first one of a pair of 3D shutter glasses to be in a transmissive state to enabling viewing of the pixels of the LC panel or the portion thereof only during the first period in time. If the first image is the left image, the first one of the pair of 3D shutter glasses is the left shutter glass. Thus, the first one of the pair of 3D shutter glasses should be controlled to be in the transmissive state (transmits light to the eye of the observer, this state is also referred to as the on-state) at least during part of the first period in time when the backlight is switched on. Because the switching of the backlight, the first one of the pair of 3D shutter glasses can be in the on-state when the backlight is switched off without the risk of causing crosstalk from the second image. Consequently, the 3D shutter glasses need not switch synchronously with the first period and thus may slowly change their optical state.

Now the 3D shutter glasses need not switch synchronously, it is possible to increase the duration of the period in time the shutter glasses are in the transmissive state. This may increase the brightness of the image displayed.

In an embodiment, the first one of the pair of 3D shutter glasses is in the on-state during a period of time longer than the first period in time while the complete first period in time is encompassed. In the same manner, the second one of the pair of 3D shutter glasses (the right shutter glass, if the first one of the pair of 3D shutter glasses is the left glass) is in a transmissive state for enabling viewing of the pixels of the LC panel or the portion thereof only during the second period in time after the second image is stabilized.

It has to be noted that U.S. Pat. No. 7,215,356 discloses a 3D stereo display device in which two sets of shutters are disposed in the display. The shutters are complimentary interlaced with each other. The opening and closing of the two sets of shutters are controlled in synchronism with the left and right pictures displayed such that the left and right eyes see independent images formed of different sub-pixels of the display to provide a 3D display effect to the bare eyes, thus without requiring shutter glasses. This prior art discloses to switch on the backlight only after the complete odd field of pixels has been addressed and the state of the LCD pixels is stable. The backlight is switched off before the succeeding even field of pixels is addressed. This prior art is not relevant to the present invention because the skilled person has no incentive to search for a solution of a problem in a 3D system using shutter glasses in a prior art which does not disclose such shutter glasses at all.

GB2420183 discloses an example of liquid crystal shutter glasses using a LCD. A switched backlight is used to minimize glare from other objects than the LCD screen.

In an embodiment, the LCD display system further comprises the pair of 3D shutter glasses. The control signal which is generated by the controller to control the optical states of the shutter glasses may be supplied to the pair of 3D shutter glasses wired or wireless. The control signal may comprise a left and a right signal to directly indicate when the left and the right glasses should be in the optical on or off state. Alternatively, the control signal may be coded.

In an embodiment, the controller controls the LC panel to display the first image and second image sequentially on the complete LC panel. Thus, first the complete LC panel is addressed, usually row by row, with the image data of the first image such that the first image is completed after the addressing of all rows and after the response time of the pixels of the last addressed row has elapsed. The period in time required for addressing one row together with the associated response time of its pixels is called the row addressing period at the end of which the pixels of this row have reached their stable optical state according to the first image data. The period in time from the start of addressing of the first row of pixels until the response time of the last row of pixels has elapsed is referred to as the first image addressing period. After the first image addressing period all pixels of the LC panel have reached their stable state. Now, the backlight unit is activated to illuminate the complete LC panel during the first period in time to only illuminate the LC panel during a first vertical blanking interval succeeding the first image addressing period. In the same manner, after a second image addressing period, the second image is displayed with the stable optical states of the pixels. The backlight unit is activated to only illuminate all the pixels during the second period in time to only illuminate the LC panel during a second vertical blanking interval succeeding the second image addressing period.

The controller generates the control signal to control the first one of the pair of 3D shutter glasses to be in the on-state during a first transmissive period in time longer than and at least partly overlapping the first period in time, and the second one of the pair of 3D shutter glasses to be in the on-state during a second transmissive period in time longer than and at least partly overlapping the second period in time.

Thus, in this embodiment in accordance with the invention, first the LC panel is addressed to display the left image. Once the optical state of the pixels of the complete LC panel corresponds substantially to the left image (after the response time has elapsed), the backlight is switched on to illuminate the complete LC panel which now shows the complete left image. In an embodiment, the left shutter glass should be switched on before the backlight is switched on such that the optical state of the left shutter glass is on when the backlight is switched on. In an embodiment, the left shutter glass should be switched off only after the backlight is switched off. The right shutter glass should be in the off-state (blocking the light). After the backlight is switched off, the LC panel is addressed to display the right image. Once the optical state of the pixels of the complete LC panel corresponds substantially to the right image, the backlight is switched on to illuminate the complete LC panel, which now shows the complete right image. In an embodiment, the right shutter glass should be switched on before the backlight is switched on such that the optical state of the right shutter glass is on when the backlight is switched on. In an embodiment, the right shutter glass should be switched off only after the backlight is switched off. The left shutter glass should be in the off-state.

In an embodiment, the controller generates the transmissive periods such that they have a maximum duration without causing substantial cross talk from the left image to the right eye and the other way around. Because the shutter glasses are non-transmissive during relatively short periods in time only, the average transmitivity is near to 100%. Consequently, the wearer of the shutter glasses is able to see the surroundings with high brightness and without flicker. Further, other viewers wearing shutter glasses do not appear as if wearing sunglasses and normal eye contact is possible between different viewers wearing shutter glasses.

It has to be noted that in current systems, the left and right shutters open and close alternatingly with 50 percent duty-cycle. Shutter systems based on LCD technology block on average at least 75% of the light. Therefore, the viewers seem to wear dark sun glasses obstructing them to see their surrounding normally or to make eye contact with other viewers. Peculiarly, inherent, the left eye of the viewer can only see the left eyes of other viewers wearing shutter glasses synchronized with the same display, and vice versa.

In an embodiment, the controller generates the first transmissive period and the second transmissive period with 50% duty cycle. This has the advantage that the left and right shutter glasses can be switched as known from the prior art to alternately occlude the left and right eye. The change of state of the glasses occurs in-between the backlight illumination periods, which usually but not necessarily are the vertical blanking intervals. Thus, the glasses may slowly change their optical state without any negative effect during the on-time of the backlight.

In an embodiment, the controller addresses a portion of the LC panel as a group of at least one row of pixels of the LC panel. For example, the LC panel may comprise p groups of q rows and p corresponding sections of the backlight. The integer q is 1 or larger; the integer p is the total number of rows of the display divided by the number q of rows per group if each group has the same number of rows. Each section of the backlight only illuminates the corresponding group of q rows. A group of rows is addressed during a first group addressing period in time in accordance with the associated portion of the first image. During the group addressing period in time, the actual addressing occurs and the pixels of the group are allowed to reach their stable state. The backlight is activated during the first period in time which now succeeds the first group addressing period in time.

Now, the display is addressed such that image data is written sequentially to the groups of rows. After the pixels of the actual group to which the data has been written have their stable optical state, the backlight is controlled to only illuminate the row or rows of this group. Or said differently, only the section of the backlight associated with this group of rows is on, all other sections are off. During the illumination period of this group of rows, the next group of rows can be addressed while the associated section of the backlight is off and, consequently, no crosstalk is created.

The backlight sections may comprise a lamp, LEDs or other suitable light sources.

In an embodiment the controller addresses the portion of the LC panel as a group of one row of pixels or at least two adjacent rows of pixels of the LC panel. The groups of the one row of pixels or the at least two adjacent rows of the LC panel are first sequentially addressed during first group address periods in time in accordance with the first image data, and then sequentially addressed in accordance with the second image data during second group address periods in time. Thus, the rows of the LC panel may be written one by one and the backlight is pulsed on for each row. Or the rows of the LC panel are written one by one for groups of at least two adjacent rows and the backlight is pulsed on for all the lines of a group. In the now following it is assumed that the groups of at least two adjacent rows are illuminated by a same segment of the backlight.

The backlight is activated during a plurality of first periods in time occurring sequentially in-between the first group address periods in time and the second group address periods in time of the corresponding groups of rows of the LC panel. In a simple embodiment, the corresponding groups of rows are the same groups of rows.

For example, after the left image lines corresponding to the actually addressed group of rows are displayed by this group of rows once the pixels of the group of rows have reached their stable optical state, the backlight section associated with this group of rows is switched on. After this backlight section is switched off, the right images lines corresponding to the same group of rows are displayed by this same group of rows once the pixels of the group of rows have reached their stable optical state, and the same backlight section is switched on again. In this manner, the group of rows can be addressed with the associated right picture lines, while another group of rows is actually displaying a portion of the left image, namely that portion for which the associated backlight section is on. As said hereinbefore, only one backlight section is active at any time. Consequently, no crosstalk between the left and right picture occurs.

In an embodiment, the controller supplies the control signal to control the first one of the of the pair of 3D shutter glasses to be in the transmissive state during a first transmissive period in time starting before a first one of the first periods of time and ending after a last one of the first periods in time. The first transmissive period in time succeeds a first addressing period of time comprising all first group address periods in time required to address all the rows of the LC panel in accordance with the first image. Thus, the switching on and off of the glasses can be slow because these transitions occur during periods in time when none of the backlight sections is on.

These and other aspects of the invention are apparent from and will be elucidated with reference to the embodiments described hereinafter.

It should be noted that items which have the same reference numbers in different Figures, have the same structural features and the same functions, or are the same signals. Where the function and/or structure of such an item has been explained, there is no necessity for repeated explanation thereof in the detailed description.

DETAILED DESCRIPTION OF THE EMBODIMENTS

Figure 1A:
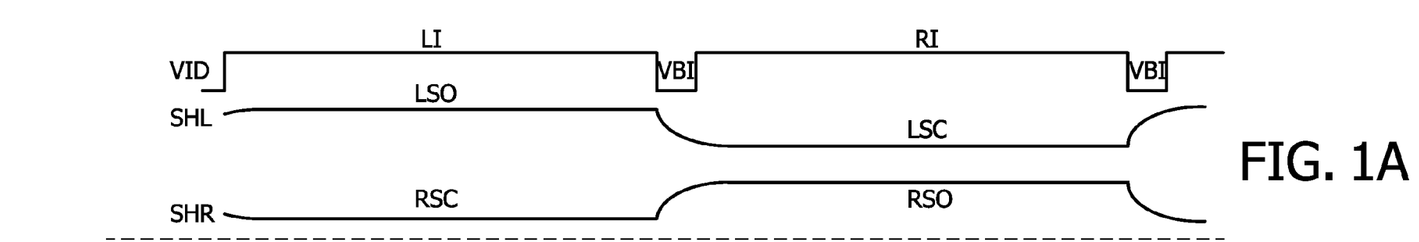
FIGS. 1A to 1C schematically show shutter timings for a CRT, a LCD without pulsed backlight and a LCD with pulsed backlight, respectively, FIGS. 2A to 2C schematically show the shutter timing and backlight pulse timing for a scanning backlight, FIG. 3 schematically shows a block diagram of a circuit for controlling the shutter and the backlight timing and a side view of the display panel and the backlight unit, FIG. 4 schematically shows a front view of the display panel and the backlight unit, FIG. 5 schematically shows an embodiment of a shutter timing for a LCD with pulsed backlight, and FIG. 6 schematically shows an embodiment of a circuit controlling the shutter timing of the shutter glasses.
Figure 1B:
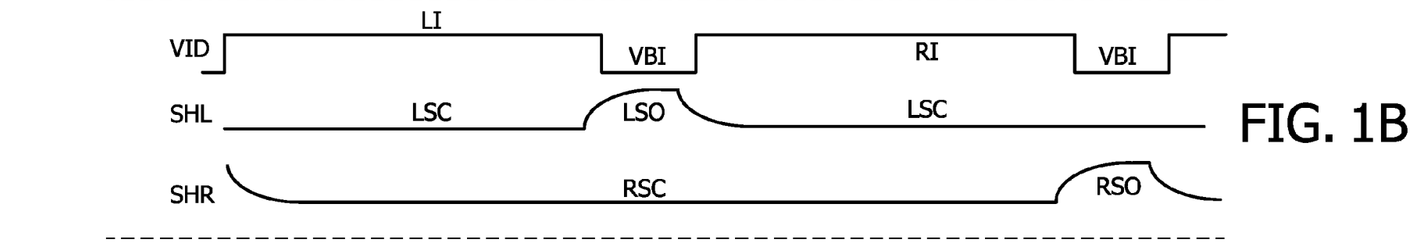
Figure 1C:
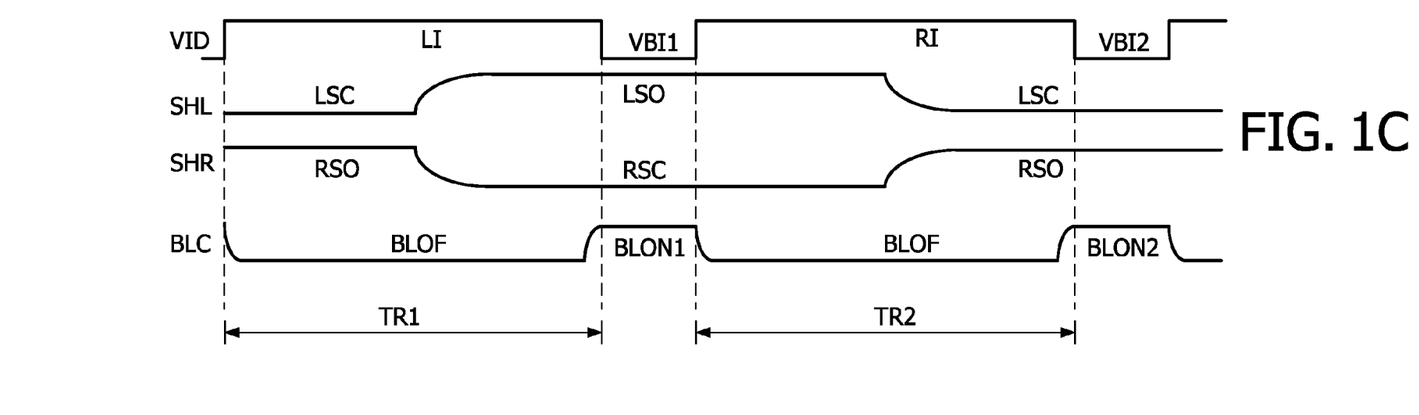

FIGS. 1A to 1C schematically respectively show shutter timings for a CRT, a LCD without pulsed backlight and a LCD with pulsed backlight.

FIG. 1A shows the known timing of the shutter glasses for a CRT. The top graph stylistically shows the period in time the left image LI is written on the CRT and the period in time the right image RI is displayed on the CRT. The vertical blanking interval in between the left image LI and the right image RI is indicated by VBI. The middle graph shows the optical state of the left shutter SHL. The left shutter SHL is in the transmissive state LSO (the left shutter is open or on) when the left image LI is displayed and in the blocking state LSC (the left shutter is closed or off) when the right image RI is displayed. The bottom graph shows the optical state of the right shutter SHR. The right shutter SHR is in the closed state RSC during display of the left image LI and is in the open state RSO during display of the right image RI.

Thus, the frame sequential stereoscopic display method of the prior art displays an alternating sequence of left and right perspective images LI, RI on the display screen of the CRT. The observer wears a pair of 3D glasses which alternately occlude the left and the right eyes such that the left eye sees only the left perspective images LI and the right eyes sees only the right perspective images RI displayed on the display screen of the CRT. The 3D glasses may be liquid crystal shutters.

FIG. 1B shows a timing of shutter glasses for a LCD (liquid crystal display) with a continuous backlight. The top graph stylistically shows the period in time the left image LI is written to the LCD and the period in time the right image RI is written to the LCD. These times that an image is written to the LCD means that the rows of the LCD are addressed and that the pixels have the time to reach their stable optical state during their response time. The vertical blanking interval in between the left and the right image is indicated by VBI. In a LCD, as in a CRT, the lines of an image are written sequentially, but now into rows of pixels of the LCD instead on phosphors. In contrast to a CRT, the pixels of a row of the LCD keep their optical state until changed during a next addressing of the same row a frame period later. Thus, only after all rows have been addressed to display the left image, none of the rows still displays the right image and it is possible to only see the left image. Consequently, the left shutter SHL may only be in the open state LSO during the vertical blanking interval VBI succeeding the writing of the left image LI. Similarly, the right shutter SHR may only be in the open state RSO during the vertical blanking VBI succeeding the writing of the right image RI. This approach leads to relatively short open periods of the left and right shutters SHL, SHR and thus requires relatively fast responding shutters.

FIG. 1C shows a timing of shutter glasses for a LCD with a pulsed backlight in accordance with the present invention. The top graph shows the period in time TR1 the left image LI and the period in time TR2 the right image RI are written (addressing and response times), the next two graphs show the optical state of the left shutter glass SHL and the right shutter glass SHR, respectively, and the bottom graph shows the backlight control BLC.

Now, the left shutter SHL is in the open state LSO around the vertical blanking intervals VBI1 succeeding the writing of the left images LI and the right shutter SHR is in the open state RSO around the vertical blanking intervals VBI2 succeeding the writing of the right images RI. In an embodiment, both the left shutter SHL and the right shutter SHR are operated with 50% duty cycle such that when the left shutter SHL is changed to the open state, the right shutter is changed to the closed state. This control of the shutters is similar as for CRTs, only the timing with respect to the vertical blanking interval VBI differs. However, the 50% duty cycle is not essential to the present invention. If both the on-transitions and the off-transitions of the shutters SHL, SHR are slow, it only matters that the duration of the shutter open times LSO, RSO is sufficiently longer than the on time BLON1, BLON2 of the backlight during the vertical blanking intervals VBI1 and VBI2, respectively, such that these transitions do not disturb the operation of the system. If the shutter is still opening while the backlight is switched on, or starts closing while the backlight is still on, the brightness of the image will be lower than possible. The shutter material may have different speeds when changing to the open state or when changing to the closed state. For example when the speed of changing to the open state is relatively fast, the shutter may be switched to the open state at the same instant or even after the backlight is switched on. Similarly, if the speed of changing to the closed state is relatively fast, the shutter may be switched to the closed state at the same instant or even before the backlight is switched off.

The back light control BLC controls the backlight to be off during the off-periods BLOF when the left images LI and the right images RI are written, and controls the backlight to be in the on-state BLON1, BLON2 during the vertical blanking intervals VBI1, VBI2, respectively. The pulsing of the backlight during the vertical blanking intervals VBI1 succeeding the writing of the left images LI causes the viewer to see the left images LI with his left eye with minimal crosstalk caused by the right images RI because the right shutter is closed during the vertical blanking interval VBI1. Although the right shutter SHR is open when rows of the left images are written, these rows of the left images LI are invisible because the backlight does not illuminate the LCD. Thus, crosstalk caused by light leakage in the off state of the optical shutter is also reduced because in this state the back light is off. The pulsing of the backlight during the vertical blanking periods VBI2 succeeding the writing of the right images RI cause the viewer to see the right images RI with his right eye with minimal crosstalk caused by the left images LI.

The pulsed backlight enables to use shutters with a slow response time because the transition of the optical state of the shutters SHL and SHR occurs before and after the on-times BLON1, BLON2 of the backlight.

In an embodiment, the backlight on-period BLON1, BLON2 may be longer than the vertical blanking period VBI at the cost of some crosstalk at the top and/or bottom rows of the display but with the advantage that the brightness becomes higher.

Figures 2A, 2B:
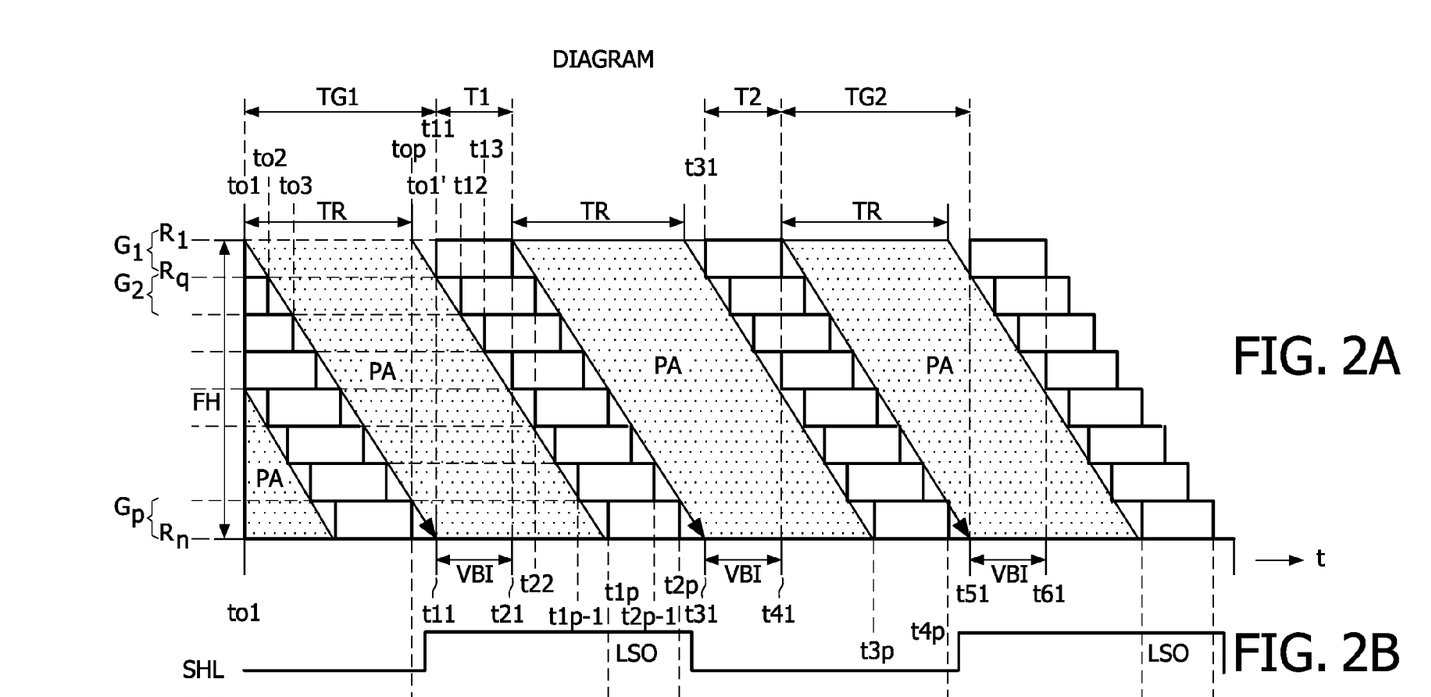
Figure 2C:
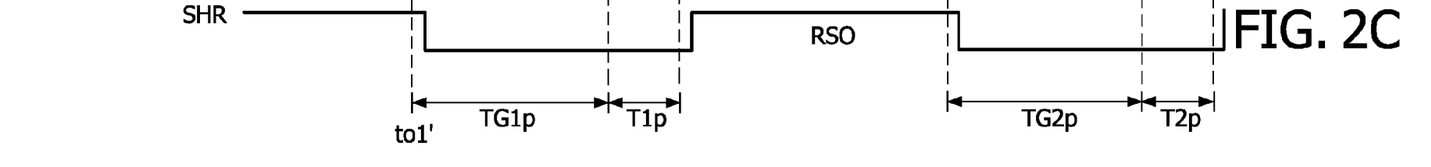

FIGS. 2A to 2C schematically show the shutter timing and backlight pulse timing for a scanning backlight. FIG. 2A shows a timing scheme for writing the left images LI and the right images RI and for activating the scanning backlight. FIG. 2B shows the optical state of the left shutter SHL and FIG. 2C shows the optical state of the right shutter SHR.

FIG. 2A shows the progressing time t along the horizontal axis and the frame height FH along the vertical axis. In the embodiment shown, the left image LI or the right image RI to be displayed on the LCD is written from top to bottom in that the first line of the image is displayed on the first row R1 and the last line of the image is written on the last row Rn of the display. However, the order of writing lines of the image to rows of pixels may differ.

At the instant t01, the first row of pixels R1 is addressed and the data of the first line of the left image LI is written to these pixels. The pixels require some time, which is called the response time TR, before their optical state corresponds to the data applied. In modern LCD's, the response time is in the order of 5 ms. Thus, the final optical state of the pixels of the first row R1 is reached at the instant t01'. Next, the second row of pixels is addressed and the data of the second line of the left image LI is written to this row. In this manner a group G1 of q rows R1 to Rq is addressed to change the optical state of the associated pixels in accordance with the corresponding lines of the left image LI. The pixels of the row Rq are addressed just before the instant t02 and reach their stable state at the instant t11.

Now, at the instant t11, all the pixels of the group G1 of rows R1 to Rq have reached their stable state and the appropriate backlight section is switched on to illuminate the pixels of this group G1. The right shutter SHR should be closed before the instant t11, and the left shutter SHL should be opened at or before the instant tn. The backlight illuminates the group G1 during a predetermined period of time T1 until the instant t21. At this instant t21, the first row R1 up till the $q^{th}$ row Rq are addressed again and the data of the first line up till the $q^{th}$ line of the right image RI are written to the pixels associated with the group G1. These pixels have stabilized their optical states in accordance with the right image RI at the instant t31. Now, the backlight for illuminating the group G1 is switched on during the period in time T2 while the right shutter SHR is open and the left shutter SHL is closed. At the instant t41, when the backlight for illuminating the group of rows G1 is switched off, the first row R1 up till the row Rq are addressed again and the data of the first line up till the $q^{th}$ line of the next left image LI are written to the pixels associated with the group G1, and so on.

Now the first left image LI is considered again. The lines of the first left image are divided into p groups G1 to Gp of consecutive lines. As already discussed, the pixels of the first group G1 of rows are addressed between the instants t01 and t02 and reach their stable optical state between the instants t01' and t11, respectively. The second group G2 of rows is addressed between the instants t02 and t03 and the associated pixels reach their stable optical state in accordance with the associated lines of the left image LI between the instants t11 and t12. The backlight is now controlled to illuminate the second group G2 of pixels starting at the instant t12 until the instant t22. The last group Gp of rows is addressed between the instants t0p and t11 and the associated pixels reach their stable optical state in accordance with the corresponding lines of the left image LI between the instants t1p-1 and t1p.

Said in other words, the rows of pixels of the LCD are divided in groups Gi of adjacent rows Ri. After the rows Ri of a group Gi are addressed to change their optical state in accordance with the corresponding lines of the left image LI to be displayed, it takes the response time before these pixels reach their stable optical state. Once the pixels of a group Gi have reached their stable optical state, the backlight is switched on to only illuminate this group Gi of rows Ri. The left glass of the 3D glasses should be open and the right glass should be closed at least during the on-time of the backlight. The same rows are addressed again for the right image RI after the backlight is switched off. After stabilization of the optical state in accordance with the corresponding lines of the right image RI, the backlight is switched on again while the left glass is closed and the right glass is open. In this embodiment, the crosstalk between left and the right image is virtually non-existent. Some crosstalk may be present if the backlight switches off slowly.

Further, also the crosstalk due to a semi transparent optical shutter during its off state is minimized.

In another embodiment some crosstalk may be allowed. For example, the backlight may be switched on while not yet all pixels of the group Gi for the left image have stabilized their optical states and/or the backlight may be switched off after some of the pixels of the group Gi for the right image RI have been addressed. For example the backlight which illuminates the rows of the group G1 may be switched on at the instant t01' and may be switched off at the instant t22. In a similar manner, the illumination of the other groups G2 to Gp may have an overlap with the addressing periods of the left image LI and right image RI. A longer overlap of the on-time of the backlight illuminating a group may be selected at the expense of more crosstalk. It has to be noted that with the on-time of the backlight illuminating a group is meant that the backlight is able to selectively illuminate the different groups G1 to Gp of rows during the on-time. Such a scanning backlight as such is well known from prior art and may comprise rows of LEDs. Each row of LEDs illuminates the rows of pixels of one of the groups G1 to Gp. Alternatively, several rows of LEDs may be used to illuminate the rows of one of the groups G1 to Gp.

The on-time of the backlight per group Gi of rows Ri may be fixed or may depend on the average brightness of the image portion to be displayed by these rows Ri.

Figure 3:
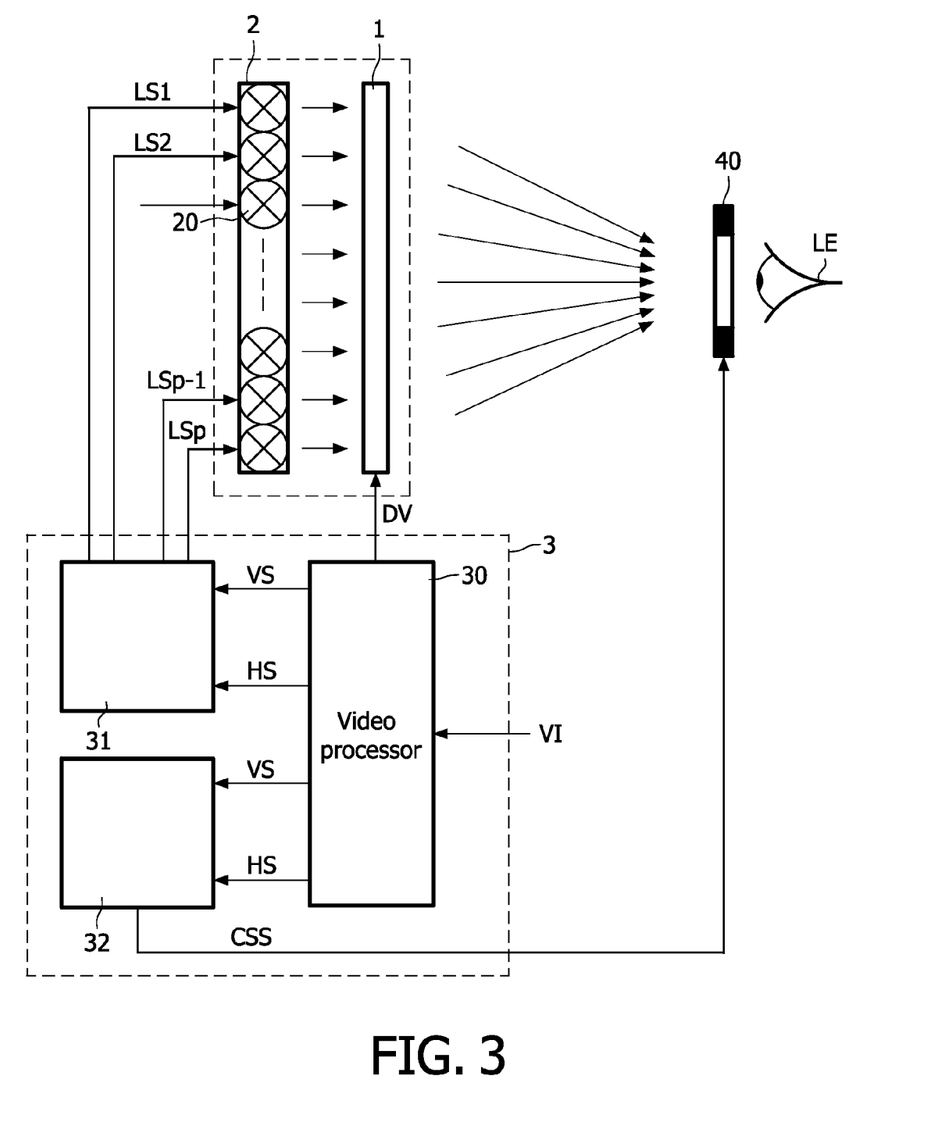

FIG. 3 schematically shows a block diagram of a circuit for controlling the shutter and the backlight timing and a side view of the display panel and the backlight unit.

Figure 4:
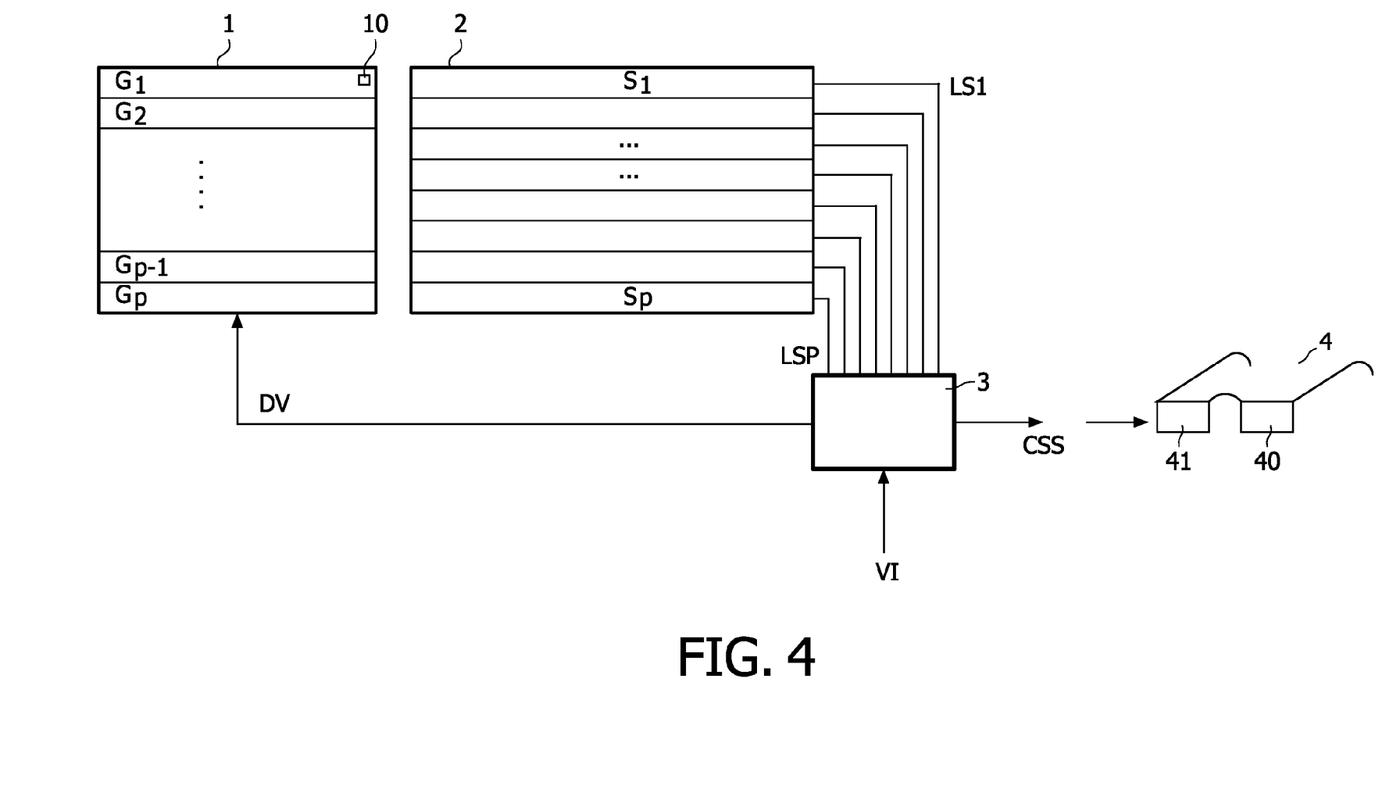

The backlight unit 2 comprises p sections of light sources 20. The light source or light sources 20 of each one of the sections can be switched on and off individually with the light source drive signals LS1 to LSp generated by the backlight control unit 31. The sections S1 to Sp are shown in FIG. 4. The backlight sections S1 to Sp illuminate associated groups of rows of the LC panel 1. These groups G1 to Gp are shown in FIG. 4. The observer views the light leaving the LC panel 1 as indicated by the arrows. Only the left eye LE of the observer and the left shutter glass 40 are shown.

The controller 3 comprises a video processor 30, a backlight controller 31 and a goggle controller 32. The video processor 30 receives the stereoscopic video input data VI to be displayed on the LC panel 1. The stereoscopic video input data VI comprises sequences of left images LI and right images RI. The video processor 30 separates the well known horizontal synchronization signal HS and the vertical synchronization signal VS from the video input data VI and supplies these synchronization signals HS, VS to both the backlight controller 31 and the goggle controller 32. The synchronization signals HS, VS may already be available separately in the video data VI, especially if the video data VI is received in a digital format and/or from a computer. The video processor 30 provides display video data DV to the LC panel 1 to control the optical state of the pixels of the LC panel 1.

The backlight controller 31 uses counters in a well known manner to count number of lines of the input video data VI, the well known addressing signals required for addressing the lines of pixels of the LC panel 1, and the response time of the LC panel 1 to switch on and off the segments of the backlight at the appropriate instants in time as shown in FIG. 2A. The number of lines are indicated by the horizontal synchronization signal HS. The position in the vertical direction on the display panel is defined by the vertical synchronization signal VS. In literature, the horizontal synchronization signal HS is also referred to as the line synchronization signal, and the vertical synchronization signal VS is also referred to as the frame synchronization signal.

The goggle controller 32 supplies the control signal CSS which control the shutter glasses. The goggle controller 32 determines the switching on and off instants of the left and right shutter glasses 40, 41 in accordance with FIG. 1C or FIGS. 2B and 2C by counting number of lines with respect to the vertical synchronization signal VS.

The response time of the pixels of the LC panel 1 and the duration of the on-time of the sections of the backlight may be predefined or may be adjustable. If predefined, fixed values covering all or most LC panels 1 may be used, or the values may depend on the actual type of LC panel used.

In the example shown in FIG. 2A, the write period (addressing period plus response time) of the first row of pixels R1 ends at the instant t01, while the write period of the last row Rn starts just before the instant t11. The time difference between these two instants t01 and t11 depends on the actual response time of the pixels and thus may differ from what is shown. If the response time is relatively short, the instant t11 may occur before the instant t01.

FIG. 4 schematically shows a front view of the display panel and the backlight unit. Although the LC panel 1 should be positioned on top of the backlight unit 2, to not obscure the backlight unit 2, the LC panel 1 is shown at the left hand side of the backlight unit 2.

Again, the controller 3 receives the input video data VI and supplies drive signals DV and LS1 to LSp to control the LC panel 1 and the backlight unit 2, respectively. The controller 3 supplies the control signal CSS to the pair of 3D shutter glasses 4 which has a left shutter glass 40 and a right shutter glass 41. In literature, the pair of 3D shutter glasses is also referred to as 3D goggles or just goggles.

Figure 5:
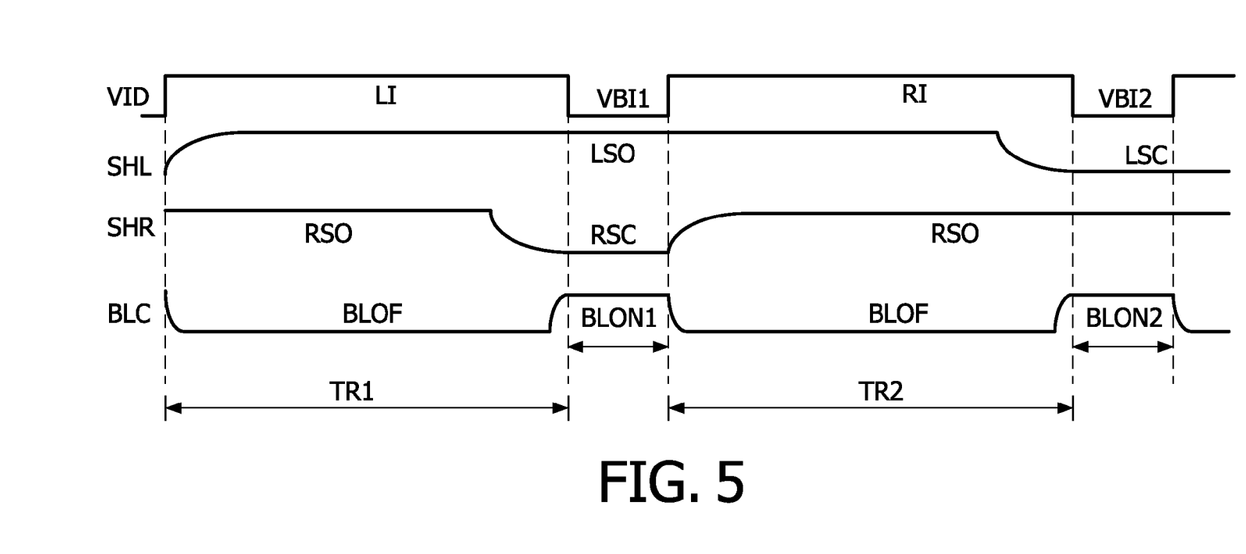

FIG. 5 schematically shows an embodiment of a shutter timing for a LCD with pulsed backlight. This Figure is based on FIG. 1C. The difference is that now the on-time of the shutter glasses is maximised. The left shutter glass is transmissive as long as possible but does not have a substantial overlap with the period in time BLON2 during which the back light is on to display the right image. This overlap is minimized to prevent cross talk. However, some overlap may be acceptable. In the same manner, the right shutter glass is transmissive as long as possible but does not have a substantial overlap with the period in time BLON1 during which the back light is on to display the left image. Again, the overlap is minimized to prevent cross talk, but some overlap may be acceptable. The relatively long on-time of the shutter glasses has the advantage that the glasses do not appear to be dark. Consequently, the wearer has a bright view on the surroundings and the visibility of his eyes, or the eyes of other viewers wearing shutter glasses, is improved.

Figure 6:
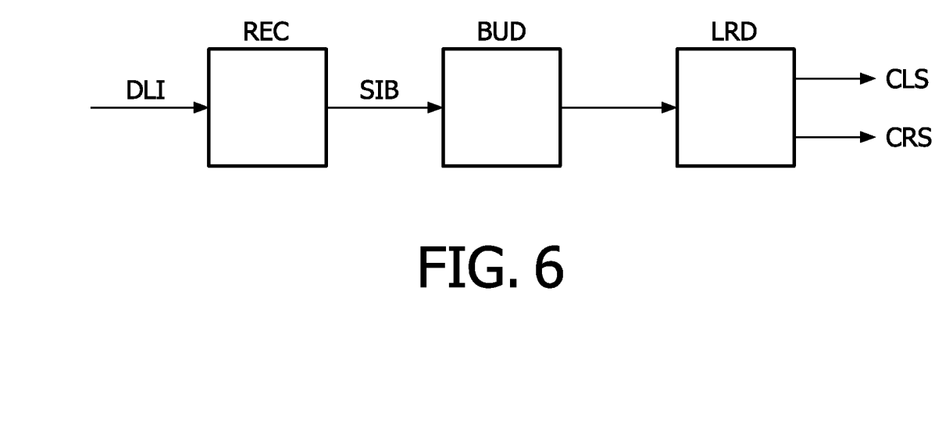

FIG. 6 schematically shows an embodiment of a circuit controlling the shutter timing of the shutter glasses.

The receiver REC receives light DLI emited by the LCD and supplies a signal SIB indicating a property of the light received. The receiver REC may comprises a light sensitive element arranged at the front side of the shutter glasses, for example between the eyes in front of or near to the nose of the wearer. The property may be the luminance of the light.

The burst detector BUD receives the signal SIB and detects the timing of the light bursts or pulses caused by the pulsed backlight. The burst detector BUD may comprise a differentiating stage which differentiates the signal SIB, and a comparator which compares the positive edge of the differentiated signal with a positive level and the negative edge with a negative level. Alternatively or additionally, the burst detector BUD may comprise a PLL (Phase Locked Loop, as such well known) which is able to suppress irrigularities in the signal SIB. For example, the PLL uses a sequence of pulses in the signal SIB to obtain an average timing of the pulses thereby decreasing the influence of noise, or disturbing light events not originating from the 3D display panel.

The driver LRD receives the detected timing of the light bursts and determines which light burst is associated with which one of the glasses to synchronize the left light burst with the left glass and the right light burst with the right glass. The driver LRD supplies a signal CLS which controls the transmissive state of the left glass and a signal CRS which controls the transmissive state of the right glass. In an embodiment, the backlight is controlled to modulate the light generated during the respective on periods for the left and the right image such that it is possible to detect which received light burst is associated with which one of the left and right images.

For example, the modulation may introduce a code by temporarily varying the intensity or another property of the light such as the color. For example, the intensity may be decreased a particular percentage during three very short periods in time for the left images and during five very short periods in time for the right images. The periods should be sufficiently short and the percentage should be selected to not introduce flicker. The total duration of the short periods may be identical for left and right images and the percentage may be different such that the influence on the average luminance is identical. Alternatively, the duration of the short periods may be different to obtain the same average luminance. Instead of using different numbers of short periods in which the property of the light is varied. Alternatively, any other modulation of a property of the light may be used, such as for example modulating the intensity according to a sinewave, blockwave or any other repetitive signal which has different frequencies for the light pulses associated with the left and the right image.

In another embodiment, the timing of one or both of the pulses may be modulated. For example, the backlight on-period for the left image is advanced and the backlight on-period for the right image is delayed a same amount of time such that the average timing does not change. These time offsets can easily be determined by comparing the actual timing of the light bursts in the signal SIB with the timing of the output signal of the PLL. A pair of 3D shutter glasses comprising a receiver (REC) for receiving light directed towards the 3D shutter glasses, a burst detector (BUD) for detecting bursts of light received and for detecting a modulation of the burst of light, wherein the modulation indicates which one of the pair of glasses has to become transmissive, and a driver (LRD) for controlling the transmissive state of the pair of glasses as indicated by the modulation.

It has to be noted that left and right can be interchanged in the foregoing examples. The variation of the property of the light generated by the back light may be compensated for by adapting the video information to be displayed for the left and right images.

The circuit controlling the shutter glasses may be mechanically combined with the shutter glasses.

It should be noted that the above-mentioned embodiments illustrate rather than limit the invention, and that those skilled in the art will be able to design many alternative embodiments without departing from the scope of the appended claims.

Although, with respect to FIGS. 3 and 4 the operation of the display system as described with respect to FIGS. 2A to 2C is discussed. The operation of the display system as described with respect to FIG. 1C can be easily deducted by understanding that the backlight unit 2 now only has a single segment illuminating the complete display panel 1.

The on-time of the pulsed backlight may be increased if the duration of the vertical blanking interval VBI is increased. However, this decreases the frame rate.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A liquid crystal display system comprising:
a liquid crystal (LC) panel;
a backlight unit for illuminating the LC panel or a portion thereof,
a controller configured to:
control the LC panel to display a first image and a second image forming a stereoscopic image;
control the backlight unit to only illuminate the LC panel or the portion thereof during a first period in time after the pixels of the LC panel or the portion thereof have a stable optical state according to the first image, and during a second period in time after the pixels of the LC panel or the portion thereof have a stable optical state according to the second image; and
generate a control signal for controlling a first one of a pair of 3D shutter glasses to be in a transmissive state for enabling viewing of the pixels of the LC panel or the portion thereof at least during part of the first period in time and a second one of the pair of 3D shutter glasses to be in the transmissive state for enabling viewing of the pixels of the LC panel or the portion thereof at least during part of the second period in time,
wherein each shutter glass of the pair of 3D shutter glasses is in the transmissive state for a period longer than a period that each shutter glass of the pair of 3D shutter glasses is in a non-transmissive state for disabling viewing of the pixels of the LC panel or the portion thereof.

2. The liquid crystal display system as claimed in claim 1, wherein
the controller is further configured to:
display the first image and second image sequentially on entirety of the LC panel;
activate the backlight unit during the first period in time to only illuminate the LC panel during a first vertical blanking interval succeeding a first image addressing period during which the pixels of the LC panel first are addressed and then have reached their stable optical state according to the first image, and during a second period in time to only illuminate the LC panel during a second vertical blanking interval succeeding a second image addressing period during which the pixels of the LC panel first are addressed and then have reached their stable optical state according to the second image; and
generate the control signal for controlling the first one of the pair of 3D shutter glasses to be in the transmissive state during a first transmissive period in time longer than and at least partly overlapping the first period in time, and the second one of the pair of 3D shutter glasses to be in the transmissive state during a second transmissive period in time longer than and at least partly overlapping the second period in time.

3. The liquid crystal display system as claimed in claim 1, wherein the controller is further configured to:
address the portion of the LC panel as a group of at least one row of pixels of the LC panel, the group of rows being addressed during a first group addressing period in time in accordance with a associated portion of the first image to obtain an optical state of pixels of the row or rows of the group in accordance with the associated portion of the first image; and
activate the backlight during the first period in time succeeding the first group addressing period in time.

4. The liquid crystal display system as claimed in claim 1, wherein the controller is further configured to:
address the portion of the LC panel as a group of one row or at least two adjacent rows of pixels of the LC panel;

sequentially address groups of one row or at least two adjacent rows of the LC panel during first group address periods in time in accordance with the first image, and sequentially address groups of the one row or at least two adjacent rows of the LC panel in accordance with the second image during second group address periods in time; and activate the backlight during a plurality of first periods in time occurring sequentially in-between first group address periods in time and second group address periods in time of corresponding groups of rows of the LC panel.

5. The liquid crystal display system as claimed in claim 4, wherein the controller is further configured to supply the control signal for controlling the first one of the of the pair of 3D shutter glasses to be in the transmissive state during a first transmissive period in time starting before a first one of the first periods of time and ending after a last one of the first periods in time, the first transmissive period in time succeeding a first addressing period of time comprising all first group address periods in time required to address all the rows of the LC panel in accordance with the first image.

6. The liquid crystal display system as claimed in claim 1, wherein the controller is further configured to control the backlight unit to differently modulate a property of the light illuminating the LC panel during the first period in time and the second period in time, respectively.

7. The liquid crystal display system as claimed in claim 1, wherein the controller is further configured to control the backlight unit to modulate a timing of the first period in time and the second period in time, wherein one of the first period in time or the second period in time is advanced while the other is delayed.

8. The liquid crystal display system as claimed in claim 1 further comprising the pair of 3D shutter glasses.

9. A method of displaying a stereoscopic image on a liquid crystal (LC) display system comprising an LC panel and a backlight unit for illuminating the LC panel or a portion thereof, the method comprising the acts of:

displaying a first image and a second image forming a stereoscopic image on the LC panel;

only illuminating the LC panel or the portion thereof with the backlight unit during a first period in time after the pixels of the LC panel or the portion thereof have a stable optical state according to the first image, and during a second period in time after the pixels of the LC panel or the portion thereof have a stable optical state according to the second image; and generating a control signal for controlling a first one of a pair of 3D shutter glasses to be in a transmissive state for enabling viewing of the pixels of the LC panel or the portion thereof only during the first period in time and a second one of the pair of 3D shutter glasses to be in the transmissive state for enabling viewing of the pixels of the LC panel or the portion thereof only during the second period in time, wherein each shutter glass of the pair of 3D shutter glasses is in the transmissive state for a period longer than a period that each shutter glass of the pair 3D shutter glasses is in a non-transmissive state for disabling viewing of the pixels of the LC panel or the portion thereof.

10. A non-transitory computer readable medium embodying comprising computer instructions which, when executed by a processor, configure the processor to perform the acts of:

displaying a first image and a second image forming a stereoscopic image on the LC panel;

only illuminating the LC panel or the portion thereof with the backlight unit during a first period in time after the pixels of the LC panel or the portion thereof have a stable optical state according to the first image, and during a second period in time after the pixels of the LC panel or the portion thereof have a stable optical state according to the second image; and generating a control signal for controlling a first one of a pair of 3D shutter glasses to be in a transmissive state for enabling viewing of the pixels of the LC panel or the portion, thereof only during the first period in time and a second one of the pair of 3D shutter glasses to be in the transmissive state for enabling viewing of the pixels of the LC panel or the portion thereof only during the second period in time, wherein each shutter glass of the pair of 3D shutter glasses is in the transmissive state for a period longer than a period that each shutter glass of the pair of 3D shutter glasses is in a non-transmissive state for disabling viewing of the pixels of the LC panel or the portion thereof.

\* \* \* \* \*